US010593056B2

(12) United States Patent
Konieczny et al.

(10) Patent No.: US 10,593,056 B2
(45) Date of Patent: Mar. 17, 2020

(54) IMAGE PROCESSING APPARATUS AND METHOD

(71) Applicant: HUAWEI TECHNOLOGIES CO., LTD., Shenzhen, Guangdong (CN)

(72) Inventors: Jacek Konieczny, Shenzhen (CN); Marek Domański, Poznan (PL); Jakub Siast, Poznan (PL); Adam Łuczak, Poznan (PL); Olgierd Stankiewicz, Poznan (PL); Krzysztof Wegner, Poznan (PL)

(73) Assignee: Huawei Technologies Co., Ltd., Shenzhen (CN)

(*) Notice: Subject to any disclaimer, the term of this patent is extended or adjusted under 35 U.S.C. 154(b) by 131 days.

(21) Appl. No.: 15/860,930

(22) Filed: Jan. 3, 2018

(65) Prior Publication Data
US 2018/0182119 A1 Jun. 28, 2018

Related U.S. Application Data

(63) Continuation of application No. PCT/EP2015/065192, filed on Jul. 3, 2015.

(51) Int. Cl.
*G06T 7/593* (2017.01)
*G06T 7/55* (2017.01)

(52) U.S. Cl.
CPC ............ *G06T 7/593* (2017.01); *G06T 7/55* (2017.01); *G06T 2200/28* (2013.01); *G06T 2207/10012* (2013.01); *G06T 2207/10028* (2013.01)

(58) Field of Classification Search
CPC ...... H04N 19/39; H04N 5/2226; H04N 5/272; H04N 13/161; H04N 19/52; H04N 19/597;
(Continued)

(56) References Cited

U.S. PATENT DOCUMENTS 8,615,254 B2 * 12/2013 Jamtgaard ............. H04W 4/029
455/456.1
9,259,840 B1 * 2/2016 Chen ....................... B25J 9/1697
(Continued)

FOREIGN PATENT DOCUMENTS

CN          102273190 A        12/2011

OTHER PUBLICATIONS

Office Action issued in Chinese Application No. 201580081235.0 dated Aug. 1, 2019, 11 pages.
(Continued)

*Primary Examiner* — Aklilu K Woldemariam
(74) *Attorney, Agent, or Firm* — Fish & Richardson P.C.

(57) ABSTRACT

The disclosure relates to an image processing apparatus for selecting a plurality of depth information values for a subset of currently processed fragments of a set of currently processed fragments of a currently processed digital image. The image processing apparatus includes a non-transitory memory storage comprising instructions and one or more hardware processors in communication with the memory storage. The one or more hardware processors execute the instructions to: process the currently processed fragments of the set of currently processed fragments in parallel; and process the currently processed fragments of the subset of currently processed fragments in parallel.

25 Claims, 6 Drawing Sheets

(58) Field of Classification Search
CPC ........... G01N 33/6845; G01N 33/6848; G16B 25/00; G16B 5/00; G06T 11/40; G06T 1/60; G06T 2207/10012; G06T 2207/10028; G06T 7/55; G06T 2200/28; G06T 2207/20228; G06T 7/593; G06T 2210/52; G06T 15/005; G06T 15/20; G06T 15/80; G06T 1/20; G06T 7/11; G06T 7/12; G06T 7/90; G06T 2207/20016; G06T 7/162; G06T 19/20; G06T 2200/08; G06T 2207/10021; G06T 7/73; G06K 9/00201; G06K 9/00342; G06K 9/00355; G06K 9/4609; G06K 9/6256; G06K 9/6297; G06K 9/00221; G06K 9/00261; G06K 9/00268; G06K 9/62; G06K 9/6273; G06K 9/66; G01S 3/7864; H04W 4/025; G06F 16/90344; G06F 16/24578; G06F 17/2785; G06F 16/5838; A61B 5/23212; G02B 7/36
USPC ........ 382/106, 154, 203; 345/420, 423, 427; 348/43, 46, 47
See application file for complete search history.

(56) References Cited

U.S. PATENT DOCUMENTS

| | | | | |
|---|---|---|---|---|
| 10,325,360 | B2* | 6/2019 | Nguyen | G06K 9/38 |
| 2002/0097241 | A1* | 7/2002 | McCormack | G06T 1/60 |
| | | | | 345/423 |
| 2003/0072483 | A1* | 4/2003 | Chen | G06K 9/32 |
| | | | | 382/154 |
| 2003/0172043 | A1* | 9/2003 | Guyon | G06K 9/6231 |
| | | | | 706/48 |
| 2006/0015494 | A1* | 1/2006 | Keating | G06F 16/5838 |
| 2009/0316988 | A1* | 12/2009 | Xu | G06K 9/6256 |
| | | | | 382/173 |
| 2010/0027845 | A1* | 2/2010 | Kim | G06K 9/00355 |
| | | | | 382/107 |
| 2010/0027892 | A1* | 2/2010 | Guan | G06K 9/00355 |
| | | | | 382/203 |
| 2010/0083101 | A1* | 4/2010 | Denoual | G06F 17/2247 |
| | | | | 715/242 |
| 2010/0177098 | A1* | 7/2010 | Oouchi | G06T 15/20 |
| | | | | 345/427 |
| 2011/0205337 | A1* | 8/2011 | Ganapathi | G06K 9/00342 |
| | | | | 348/46 |
| 2011/0211108 | A1 | 9/2011 | Pollard | |
| 2013/0229485 | A1* | 9/2013 | Rusanovskyy | H04N 19/597 |
| | | | | 348/43 |
| 2014/0043329 | A1* | 2/2014 | Wang | G06T 17/20 |
| | | | | 345/420 |
| 2018/0144535 | A1* | 5/2018 | Ford | G06T 15/005 |

OTHER PUBLICATIONS

Search Report issued in Chinese Application No. 201580081235.0 dated Jul. 26, 2019, 2 pages.

Xuefeng Chang et al. Real-Time Accurate Stereo Matching using Modified Two-Pass Aggregation and Winner-Take-All Guided Dynamic Programming. 2011 International Conference on 3D Imaging, Modeling, Processing, Visualization and Transmission. IEEE 2011. pp. 73-79.XP031896469.

Hailong Fu:"Dense matching GPU implementation", Master''s thesis, Jan. 1, 2013, pp. 1-10, XP055260672.

Simon Hermann et al. Iterative Semi-Global Matching for Robust Driver Assistance Systems, ACCV 2012.total 15 pages. XP047027087.

Christian Banz et al. Real-Time Stereo Vision System using Semi-Global Matching Disparity Estimation: Architecture and FPGA-Implementation. 2010 IEEE. pp. 93-101.XP031806017.

Heiko Hirschmüller et al. Evaluation of Cost Functions for Stereo Matching. 2007 IEEE. Total 8 pages.

Daniel Scharstein et al. A Taxonomy and Evaluation of Dense Two-Frame Stereo Correspondence Algorithms. International Journal of Computer Vision 47, 2002. total 35 pages.

International Search Report and Written Opinion in International Application No. PCT/EP2015/065192, dated Apr. 6, 2016, 18 pages.

* cited by examiner

IMAGE PROCESSING APPARATUS AND METHOD

CROSS-REFERENCE TO RELATED APPLICATIONS

This application is a continuation of International Application No. PCT/EP2015/065192, filed on Jul. 3, 2015, the disclosure of which is hereby incorporated by reference in its entirety.

TECHNICAL FIELD

The present disclosure relates to an image processing apparatus and method. In particular, the present disclosure relates to an image processing apparatus and method for selecting a depth information value for a fragment of a digital image.

BACKGROUND

In many known algorithms for estimating the disparity or depth (herein collectively referred to collectively as a depth information value) for a given fragment of a digital image, for instance a pixel or a group of pixels of a digital image, the depth information value is selected as the best one from a set of depth information values under consideration. Often the selection is done by minimization of a cost function $C_{current}(d)$ with respect to the depth information value d for a currently processed fragment.

This cost function can be a purely local fragment matching error $M_{current}(d)$ like in the well-known "Winner-Takes-All (WTA) algorithm" described, for instance, in D. Scharstein & R. Szeliski "A taxonomy and evaluation of dense two-frame stereo correspondence algorithms", International Journal of Computer Vision 47, 7-42, 2002. In such algorithms the depth information value for each fragment is selected independently from depth information values of other fragments as $$d_{best} = \underset{d}{\arg\min} [M_{current}(d)] \quad (1)$$

where $$\underset{d}{\text{argmin}}$$

[·] denotes the selection of the depth information value d for which the expression within the square brackets is minimal.

The matching error $M_{current}(d)$ for the position (x,y) of the fragment in the image and the depth information value d associated with the fragment are usually computed using an error function, which determines the difference between the value of the image I in position (x,y) and the value of the reference image $I_{ref}$ (or images) in position (x+d,y). Usually, the term value of the image refers to color channels or a luminance value of the texture image, but may be also combined with a horizontal and vertical gradient. The commonly used error functions are the sum of absolute differences (SAD) given by the following equation (2) or the sum of squared differences (SSD) given by the following equation (3) (see, for instance, H. Hirschmueller and D. Scharstein, "Evaluation of Cost Functions for Stereo Matching", IEEE Conference on Computer Vision and Pattern Recognition, 2007):

$$M_{current}(d) = SAD(I(x,y), I_{ref}(x+d,y)) = |I(x,y) - I_{ref}(x+d,y)| \quad (2)$$

$$M_{current}(d) = SSD(I(x,y), I_{ref}(X+d,y)) = (I(x,y) - I_{ref}(x+d,y))^2 \quad (3)$$

In more advanced algorithms (like in Viterbi, Forward or Belief Propagation algorithms, also described in the above-referenced article by D. Scharstein & R. Szeliski) a more sophisticated cost function $C_{current}(d)$ is used for minimization and selection of the resulting depth information value. In such a case, $C_{current}(d)$ typically is a sum of $M_{current}(d)$ with a min-convolution of a transition cost function T with costs related to all considered depth information values in neighboring fragments, i.e. additionally includes a smoothing term. In Forward and Viterbi algorithms, the neighboring fragments are those that have already been processed to obtain their depth information value d, and, therefore, $C_{current}(d)$ for a given depth information value d accumulates the cost from all previously processed fragments (designated by the index "prev") considered for the depth information value estimation of the currently processed fragment (designated by the index "current"):

$$C_{current}(d) = C_{prev}(d) \underset{min}{*} T(q, d) + M_{current}(d) \quad (4)$$

where $M_{current}(d)$ is the local fragment matching error for the depth information value d as described before, $C_{prev}(d)$ is the cost for a previously processed fragment for the depth information value d, T(q,d) is a two-argument transition-cost function (cost for changing from depth information value q to depth information value d) and the operator $$\underset{min}{*}$$

denotes the min-convolution, defined as:

$$C_{prev}(d) \underset{min}{*} T(q, d) = \min_q (C_{prev}(q) + T(q, d)) \quad (5)$$

wherein $\min_q$ denotes the smallest value with respect to q and both q and d belong to the considered range of depth information values (which is typically set a priori according to the parameters of the visual scene under consideration, i.e. object distance to the cameras). An exemplary transition cost function known from literature is the Potts model:

$$T_{Potts}(q, d) = \begin{cases} 0 & \text{if } d = q \\ \text{penalty} & \text{if } d \neq q \end{cases} \quad (6)$$

The cost for the current fragment $C_{current}(d)$ is calculated for all depth information values d considered for the depth information value estimation of the currently processed fragment.

In Belief Propagation algorithms, the final selection of depth information values for fragments can be done after multiple iterations of the algorithm.

In Forward algorithms the decision on the selection of the depth information value is done on-the-fly on the basis of the accumulated cost $$d_{best} = \underset{d}{\arg\min}\, [C_{current}(d)].$$

In Viterbi algorithms, the final selection of depth information values is postponed to an additional pass of backtracking, executed when all cost values are known.

The currently known algorithms, that provide high fidelity of the estimated depth information values, in particular disparity or depth values, are computationally complex and are not suitable for real-time processing, for instance, on mobile devices. On the other hand, currently known simple depth information value estimation algorithms, that can estimate depth information values in real-time, for instance, on mobile devices, provide limited fidelity of the results obtained.

Thus, there is a need for an improved image processing apparatus and method, in particular an image processing apparatus and method providing high fidelity of the estimated depth information values in a computationally efficient manner.

SUMMARY

It is an objective of the disclosure to provide an improved image processing apparatus and method, in particular an image processing apparatus and method providing high fidelity of the estimated depth information values in a computationally efficient manner.

This objective is achieved by the subject matter of the independent claims. Further implementation forms are provided in the dependent claims, the description and the figures.

According to a first aspect the disclosure relates to an image processing apparatus for selecting a plurality of depth information values for a subset or layer of currently processed fragments of a set or group of currently processed fragments of a currently processed digital image. The image processing apparatus comprises a signal processing logic configured to process the currently processed fragments of the set of currently processed fragments in parallel by computing for each currently processed fragment a plurality of similarity measures based on a plurality of depth information value candidates, wherein each depth information value candidate of the plurality of depth information value candidates defines a reference fragment candidate of a digital reference image, and to process the currently processed fragments of the subset of currently processed fragments in parallel by comparing for each currently processed fragment of the subset of currently processed fragments a depth information value candidate of the plurality of depth information value candidates with a previously selected depth information value, applying for each currently processed fragment of the subset of currently processed fragments an updating function to obtain an updated similarity measure based on the similarity measure or a further processed similarity measure and the result of the comparison between the depth information value candidate associated with the similarity measure and the previously selected depth information value, and determining for each currently processed fragment of the subset of currently processed fragments whether to select the depth information value candidate as the depth information value for the currently processed fragment depending on the updated similarity measure of the depth information value candidate or the further processed similarity measure of the depth information value candidate.

The signal processing logic can be a processor, e.g. a multi-purpose processor or a digital signal processor (DSP), an ASIC, a FPGA, CPU, GPU and the like. The depth information value can be, for example, a depth value, a disparity value, or an index or label representing a depth value or a disparity value. The fragment can be, for example, a pixel or a group of pixels of the current digital image and the digital reference image.

In a first possible implementation form of the first aspect of the disclosure as such the signal processing logic is configured to apply for each currently processed fragment of the subset of currently processed fragments the updating function by applying for each currently processed fragment of the subset of currently processed fragments a weighting function on the calculated similarity measure to obtain the updated similarity measure.

In a second possible implementation form of the first aspect of the disclosure as such the signal processing logic is configured to compute for each currently processed fragment of the set of currently processed fragments a plurality of similarity measures and to determine for each currently processed fragment of the set of currently processed fragments a preliminary depth information value depending on the plurality of similarity measures, and the signal processing logic is configured to apply for each currently processed fragment of the subset of currently processed fragments the updating function to obtain an updated similarity measure only for those depth information value candidates of the plurality of depth information value candidates which are equal to the preliminary depth information value or the previously selected depth information value, wherein the updating function is a weighting function.

In a third possible implementation form of the first aspect of the disclosure as such the first or second implementation form thereof each similarity measure of the plurality of similarity measures is a matching cost and each updated similarity measure of the plurality of updated similarity measures is an updated matching cost, wherein the weighting function is configured such that, in case the depth information value candidate associated with a similarity measure of the plurality of similarity measures is different from the previously selected depth information value, the matching cost is increased, and/or such that, in case the depth information value candidate associated with a similarity measure of the plurality of similarity measures is identical to the previously selected depth information value, the matching cost is maintained or increased to a smaller extent compared to the case where the depth information value candidate associated with a similarity measure of the plurality of similarity measures is different from the previously selected depth information value.

In a fourth possible implementation form of the third implementation form of the first aspect of the disclosure the weighting function is configured such that in case the depth information value candidate associated with a similarity measure of the plurality of similarity measures is different from the previously selected depth information value, the matching cost is increased by adding a first matching cost penalty to the matching cost to obtain the updated matching cost, or by multiplying the matching cost with a first matching cost penalty to obtain the updated matching cost, and/or such that, in case the depth information value candidate associated with a similarity measure of the plurality of similarity measures is identical to the previously selected depth information value, the matching cost is maintained or increased by adding a second matching cost penalty to the matching cost to obtain the updated matching cost, or by multiplying the matching cost with a second matching cost penalty to obtain the updated matching cost, wherein the second matching cost penalty is smaller than the first matching cost penalty.

In a fifth possible implementation form of the first aspect of the disclosure as such or any one of the first to fourth implementation form thereof each similarity measure of the plurality of similarity measures is a matching probability and each updated similarity measure of the plurality of updated similarity measures is an updated matching probability, wherein the weighting function is configured such that, in case the depth information value candidate associated with a similarity measure of the plurality of similarity measures is different from the previously selected depth information value, the matching probability is decreased, and/or such that, in case the depth information value candidate associated with a similarity measure of the plurality of similarity measures is identical to the previously selected depth information value, the matching probability is maintained or decreased to a smaller extent compared to the case where the depth information value candidate associated with a similarity measure of the plurality of similarity measures is different from the previously selected depth information value.

In a sixth possible implementation form of the fifth implementation form of the first aspect of the disclosure the weighting function is configured such that, in case the depth information value candidate associated with a similarity measure of the plurality of similarity measures is different from the previously selected depth information value, the matching probability is decreased by subtracting a first matching probability penalty from the matching probability to obtain the updated matching probability, or by dividing the matching probability by a first matching probability penalty to obtain the updated matching probability, and/or such that, in case the depth information value candidate associated with a similarity measure of the plurality of similarity measures is identical to the previously selected depth information value, the matching probability is maintained or decreased by subtracting a second matching probability penalty from the matching probability to obtain the updated matching probability, or by dividing the matching probability by a second matching probability penalty to obtain the updated matching probability, wherein the first matching probability penalty is larger than the second matching probability penalty.

In a seventh possible implementation form of the first aspect of the disclosure as such the signal processing logic is configured to compute for each currently processed fragment of the set of currently processed fragments a plurality of similarity measures and to obtain for each similarity measure a further processed similarity measure by applying a processing function to each similarity measure, the signal processing logic is configured to apply for each currently processed fragment of the subset of currently processed fragments the updating function to obtain an updated similarity measure only for those depth information value candidates of the plurality of depth information value candidates which are equal to the previously selected depth information value, wherein the updating function is a weighting function, and the signal processing logic is configured to determine for each currently processed fragment of the subset of currently processed fragments whether to select the depth information value candidate as the depth information value for the currently processed fragment depending on the updated similarity measure of the depth information value candidate or the further processed similarity measure of the depth information value candidate.

In an eighth possible implementation form of the seventh implementation form of the first aspect of the disclosure as such each similarity measure of the plurality of similarity measures is a matching cost and each further processed similarity measure of the plurality of further processed similarity measures is a further processed matching cost, wherein the processing function is configured such that the matching cost is increased and wherein the weighting function is configured such that, in case the depth information value candidate associated with a similarity measure of the plurality of similarity measures is different from the previously selected depth information value, the matching cost is increased, and/or such that, in case the depth information value candidate associated with a similarity measure of the plurality of similarity measures is identical to the previously selected depth information value, the matching cost is maintained or increased to a smaller extent compared to the case where the depth information value candidate associated with a similarity measure of the plurality of similarity measures is different from the previously selected depth information value.

In a ninth possible implementation form of the eighth implementation form of the first aspect of the disclosure as such the processing function is configured such that the matching cost is increased by adding a matching cost penalty to the matching cost to obtain the further processed matching cost or by multiplying the matching cost with a matching cost penalty to obtain the further processed matching cost, wherein the weighting function is configured such that in case the depth information value candidate associated with a similarity measure of the plurality of similarity measures is different from the previously selected depth information value, the matching cost is increased by adding a first matching cost penalty to the matching cost to obtain the updated matching cost, or by multiplying the matching cost with a first matching cost penalty to obtain the updated matching cost, and/or such that, in case the depth information value candidate associated with a similarity measure of the plurality of similarity measures is identical to the previously selected depth information value, the matching cost is maintained or increased by adding a second matching cost penalty to the matching cost to obtain the updated matching cost, or by multiplying the matching cost with a second matching cost penalty to obtain the updated matching cost, wherein the second matching cost penalty is smaller than the first matching cost penalty.

In a tenth possible implementation form of the seventh implementation form of the first aspect of the disclosure as such each similarity measure of the plurality of similarity measures is a matching probability and each updated similarity measure of the plurality of updated similarity measures is an updated matching probability, wherein the processing function is configured such that the matching probability is decreased and wherein the weighting function is configured such that, in case the depth information value candidate associated with a similarity measure of the plurality of similarity measures is different from the previously selected depth information value, the matching probability is decreased, and/or such that, in case the depth information value candidate associated with a similarity measure of the plurality of similarity measures is identical to the previously selected depth information value, the matching probability is maintained or decreased to a smaller extent compared to the case where the depth information value candidate associated with a similarity measure of the plurality of similarity measures is different from the previously selected depth information value.

In an eleventh possible implementation form of the tenth implementation form of the first aspect of the disclosure as such the processing function is configured such that the matching probability is decreased by subtracting a matching probability penalty from the matching probability to obtain the updated matching probability or by dividing the matching probability by a matching probability penalty to obtain the updated matching probability, wherein the weighting function is configured such that, in case the depth information value candidate associated with a similarity measure of the plurality of similarity measures is different from the previously selected depth information value, the matching probability is decreased by subtracting a first matching probability penalty from the matching probability to obtain the updated matching probability, or by dividing the matching probability by a first matching probability penalty to obtain the updated matching probability, and/or such that, in case the depth information value candidate associated with a similarity measure of the plurality of similarity measures is identical to the previously selected depth information value, the matching probability is maintained or decreased by subtracting a second matching probability penalty from the matching probability to obtain the updated matching probability, or by dividing the matching probability by a second matching probability penalty to obtain the updated matching probability, wherein the first matching probability penalty is larger than the second matching probability penalty.

In a twelfth possible implementation form of the first aspect of the disclosure as such or any one of the first to eleventh implementation form thereof each similarity measure of the plurality of similarity measures is a matching cost and each updated similarity measure of the plurality of updated similarity measures is an updated matching cost, wherein the signal processing logic is configured to select for each fragment of the currently processed subsets of fragments the depth information value for the fragment from the depth information value candidates associated with the plurality of similarity measures computed for the fragment, which has the smallest weighted matching cost, or each similarity measure of the plurality of similarity measures is a matching probability and each weighted similarity measure of the plurality of weighted similarity measures is a weighted matching probability, wherein the signal processing logic is configured to select for each fragment of the currently processed subsets of fragments the depth information value for the fragment from the depth information value candidates associated with the plurality of similarity measures computed for the fragment, which has the largest weighted matching probability.

In a thirteenth possible implementation form of the first aspect of the disclosure as such or any one of the first to twelfth implementation form thereof the signal processing logic is configured to compare for each currently processed fragment of the subset of currently processed fragments the depth information value candidate of the plurality of depth information value candidates with depth information values within a range around the previously selected depth information value, and apply for each currently processed fragment of the subset of currently processed fragments the updating function to obtain an updated similarity measure dependent on whether any of the depth information values within the range around the previously selected depth information value is identical to the depth information value candidate associated with each similarity measure.

According to a second aspect the disclosure relates to an image processing method for selecting a plurality of depth information values for a subset or layer of currently processed fragments of a set or group of currently processed fragments of a currently processed digital image. The image processing method comprises the steps of: processing the currently processed fragments of the set of currently processed fragments in parallel by computing for each currently processed fragment a plurality of similarity measures based on a plurality of depth information value candidates, wherein each depth information value candidate of the plurality of depth information value candidates defines a reference fragment candidate of a digital reference image; and processing the currently processed fragments of the subset of currently processed fragments in parallel by comparing for each currently processed fragment of the subset of currently processed fragments a depth information value candidate of the plurality of depth information value candidates with a previously selected depth information value, applying for each currently processed fragment of the subset of currently processed fragments an updating function to obtain an updated similarity measure based on the similarity measure or a further processed similarity measure and the comparison between the depth information value candidate associated with the similarity measure and the previously selected depth information value, and determining for each currently processed fragment of the subset of currently processed fragments whether to select the depth information value candidate as the depth information value for the currently processed fragment depending on the updated similarity measure of the depth information value candidate or the further processed similarity measure of the depth information value candidate.

The image processing method according to the second aspect of the disclosure can be performed by the image processing apparatus according to the first aspect of the disclosure. Further features of the image processing method according to the second aspect of the disclosure result directly from the functionality of the image processing apparatus according to the first aspect of the disclosure and its different implementation forms.

According to a third aspect the disclosure relates to a computer program comprising program code for performing the method according to the second aspect of the disclosure when executed on a computer.

The disclosure can be implemented in hardware and/or software.

BRIEF DESCRIPTION OF THE DRAWINGS

Further embodiments of the disclosure will be described with respect to the following figures, in which.

In the various figures, identical reference signs will be used for identical or at least functionally equivalent features.

DETAILED DESCRIPTION OF EMBODIMENTS

In the following detailed description, reference is made to the accompanying drawings, which form a part of the disclosure, and in which are shown, by way of illustration, specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that a disclosure in connection with a described method may also hold true for a corresponding device or system configured to perform the method and vice versa. For example, if a specific method step is described, a corresponding device or apparatus may include a unit to perform the described method step, even if such unit is not explicitly described or illustrated in the figures. Further, it is understood that the features of the various exemplary aspects described herein may be combined with each other, unless specifically noted otherwise.

Figure 1:
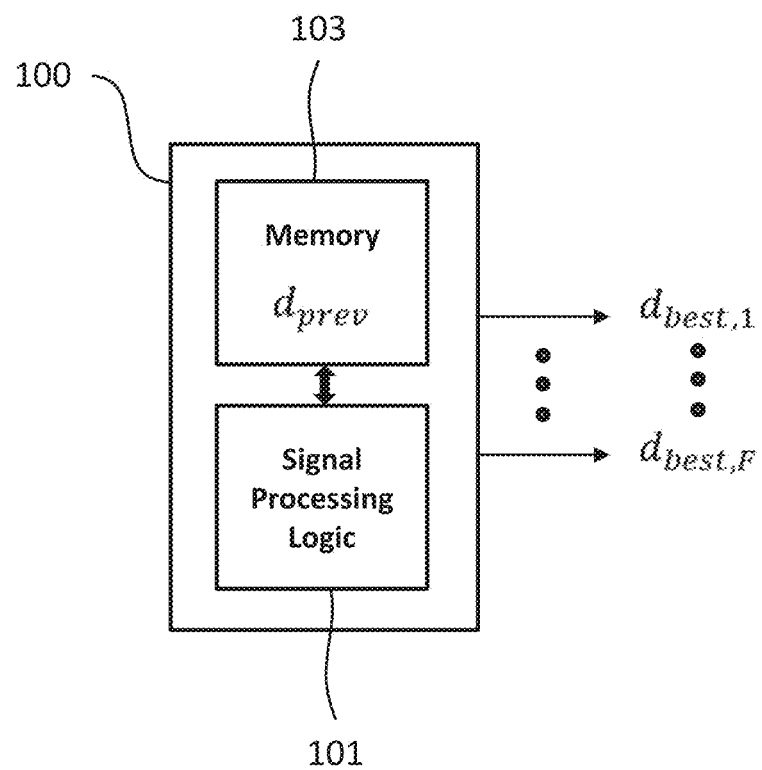
FIG. 1 shows a schematic diagram of an image processing apparatus according to an embodiment.

FIG. 1 shows a schematic diagram of an image processing apparatus 100 according to an embodiment. The image processing apparatus 100 is configured to select a plurality of depth information values $d_{best,1-F}$ for a subset or layer of currently processed fragments of a set or group of currently processed fragments of a currently processed digital image. The depth information values $d_{best,1-F}$ can be, for example, depth values, disparity values, or indices or labels representing depth values or disparity values. The currently processed fragments can be, for example, currently processed pixels or currently processed groups of pixels of a digital image.

The image processing apparatus 100 comprises a signal processing logic 101. The signal processing logic 101 is configured to process the currently processed fragments of the set of currently processed fragments in parallel by computing for each currently processed fragment a plurality of similarity measures based on a plurality of depth information value candidates, wherein each depth information value candidate $d_i$ of the plurality of depth information value candidates defines a reference fragment candidate of a digital reference image, and to process the currently processed fragments of the subset of currently processed fragments in parallel by comparing for each currently processed fragment of the subset of currently processed fragments a depth information value candidate $d_i$ of the plurality of depth information value candidates with a previously selected depth information value $d_{prev}$, applying for each currently processed fragment of the subset of currently processed fragments an updating function to obtain an updated similarity measure based on the similarity measure or a further processed similarity measure and the result of the comparison between the depth information value candidate $d_i$ associated with the similarity measure and the previously selected depth information value $d_{prev}$, and determining for each currently processed fragment of the subset of currently processed fragments whether to select the depth information value candidate $d_i$ as the depth information value for the currently processed fragment $d_{best}$ depending on the updated similarity measure of the depth information value candidate $d_i$ or the further processed similarity measure of the depth information value candidate $d_i$.

The signal processing logic 101 can be a processor, e.g. a multi-purpose processor or a digital signal processor (DSP), an ASIC, a FPGA, CPU, GPU and the like. As will be described in more detail further below, the similarity measure can be, for example, a matching cost or a matching probability, wherein the matching cost is a measure indicating a difference between a currently processed fragment and the reference fragment and increases with increasing difference and wherein the matching probability is a measure indicating a likelihood/probability that a currently processed fragment and the reference fragment match and decreases with increasing difference.

In an embodiment, the image processing apparatus 100 comprises a memory 103 for storing the previously selected depth information value $d_{prev}$.

Figure 2:
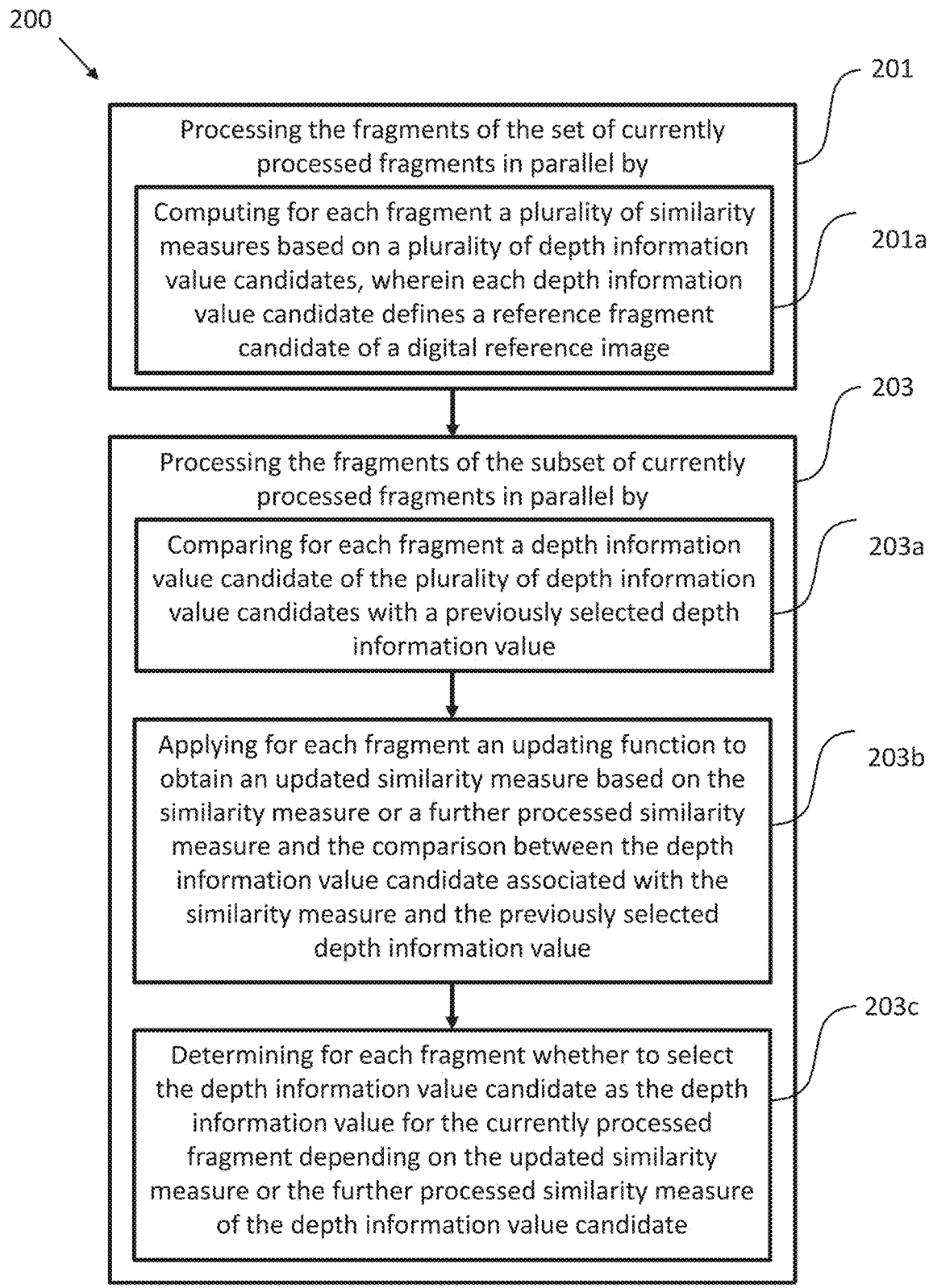
FIG. 2 shows a schematic diagram of an image processing method according to an embodiment.

FIG. 2 shows a schematic diagram of an image processing method 200 for selecting a plurality (e.g. F) of depth information values $d_{best,1-F}$ for a subset or layer of currently processed fragments of a set or group of currently processed fragments of a currently processed digital image. The image processing method comprises the following steps. As part of a step 201 of processing the currently processed fragments of the set of currently processed fragments in parallel a step 201a of computing for each currently processed fragment a plurality of similarity measures based on a plurality of depth information value candidates, wherein each depth information value candidate $d_i$ of the plurality of depth information value candidates defines a reference fragment candidate of a digital reference image. As part of a step 203 of processing the currently processed fragments of the subset of currently processed fragments in parallel a step 203a of comparing for each currently processed fragment of the subset of currently processed fragments a depth information value candidate $d_i$ of the plurality of depth information value candidates with a previously selected depth information value $d_{prev}$, a step 203b of applying for each currently processed fragment of the subset of currently processed fragments an updating function to obtain an updated similarity measure based on the similarity measure or a further processed similarity measure and the comparison between the depth information value candidate $d_i$ associated with the similarity measure and the previously selected depth information value $d_{prev}$, and a step 203c of determining for each currently processed fragment of the subset of currently processed fragments whether to select the depth information value candidate $d_i$ as the depth information value $d_{best}$ for the currently processed fragment depending on the updated similarity measure of the depth information value candidate $d_i$ or the further processed similarity measure of the depth information value candidate $d_i$.

In the following, further implementation forms and embodiments of the image processing apparatus 100 and the image processing method 200 are described.

In an embodiment, the signal processing logic 101 is configured to apply for each currently processed fragment of the subset of currently processed fragments the updating function by applying for each currently processed fragment of the subset of currently processed fragments a weighting function on the calculated similarity measure to obtain the updated similarity measure.

In an embodiment, the similarity measure is a matching cost and the updated similarity measure is an updated matching cost. More specifically, the updated matching cost $C_{current}(d)$ for a given image fragment and for a depth information value candidate d is defined as a sum of image fragment matching costs $M_{current}(d)$ and a constant penalty value, conditionally, if the given depth information value candidate is different from the depth information value $d_{prev}$ selected for a previously processed fragment, i.e.:

$$C_{current}(d) = M_{current}(d) + \begin{cases} 0 & \text{if } d = d_{prev} \\ \text{pentalty} & \text{if } d \neq d_{prev} \end{cases} \quad (7)$$

In an embodiment, the matching cost $M_{current}(d)$ can be, for instance, the sum of absolute differences (SAD) given by the above equation (2) or the sum of squared differences (SSD) given by the above equation (3).

In an embodiment, the penalty value defined in above equation (7) can be determined "experimentally". As a rule of thumb, its value should be comparable to the level of noise present in the similarity measure, for instance the matching cost $M_{current}(d)$, for the processed images.

Figure 3:
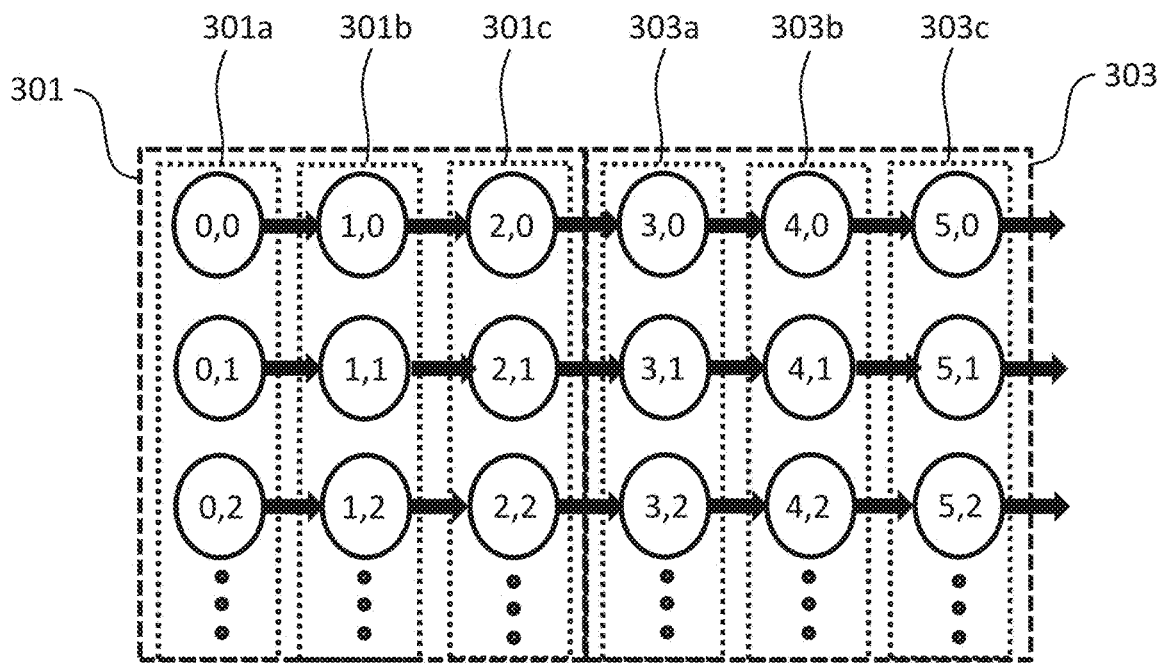
FIG. 3 shows a schematic diagram illustrating a parallel processing algorithm implemented in an image processing apparatus according to an embodiment.

FIG. 3 shows a schematic diagram illustrating a parallel processing algorithm implemented in an image processing apparatus according to an embodiment, for instance the image processing apparatus 100 shown in FIG. 1. More specifically, FIG. 3 shows a portion of a currently processed digital image 300 comprising a first exemplary set or group 301 of currently processed fragments and a second exemplary set or group 303 of currently processed fragments. In the exemplary embodiment shown in FIG. 3 the fragments correspond to pixels of the currently processed digital image 300, wherein each pixel is defined by its x and y coordinates, such as the pixel at coordinates (0,0) in the upper left hand corner of the digital image 300. The first exemplary set or group 301 of currently processed fragments/pixels comprises three exemplary subsets or layers of currently processed fragments/pixels, namely the subsets 301a, 301b and 301c. Likewise, the second exemplary set or group 303 of currently processed fragments/pixels comprises three exemplary subsets or layers of currently processed fragments/pixels, namely the subsets 303a, 303b and 303c.

In an embodiment, the signal processing logic 101 of the image processing apparatus 100 shown in FIG. 1 is configured to process the fragments of the first set or group 301 in parallel by computing for each fragment a plurality of matching costs $M_{current}(d_i)$ on the basis of a plurality of depth information value candidates $d_i$. In an embodiment, these matching costs $M_{current}(d_i)$ can be stored in the memory 103 of the image processing apparatus. In an embodiment, the signal processing logic can be configured to process at the same time also the fragments of the second set or group 303 in parallel by computing for each fragment a plurality of matching costs $M_{current}(d_i)$ on the basis of a plurality of depth information value candidates $d_i$.

Having processed the fragments of the first set or group 301 (and possibly of the second set or group 303) in parallel by computing a plurality of matching costs for each fragment, in an embodiment the signal processing logic 101 is configured to process the fragments of the subset or layer 301a of the first set or group 301 in parallel by comparing for each fragment of the subset or layer 301a, for instance, the exemplary pixels (0,0), (0,1) and (0,2) shown in FIG. 3, the depth information value candidate $d_i$ associated with each matching cost $M_{current}(d_i)$ to the previously selected depth information value $d_{prev}$. For example, for each depth information value candidate $d_i$ of each fragment of the subset or layer 301a the cost function $C_{current}(d_i)$ defined in equation (7) above is applied to the matching cost $M_{current}(d_i)$ to obtain the updated matching cost on the basis of the comparison between $d_i$ and $d_{prev}$. As the person skilled in the art will appreciate, the cost function $C_{current}(d_i)$ defined in equation (7) above penalizes depth information value candidates $d_i$ other than $d_{prev}$.

In an embodiment, the signal processing logic 101 is further configured to select for each fragment of the subset or layer 301a, for instance, the exemplary pixels (0,0), (0,1) and (0,2) shown in FIG. 3, on the basis of the updated matching cost, i.e. the cost function $C_{current}(d_i)$, the depth information value candidate $d_i$ that has a minimal updated matching cost as the depth information value $d_{best}$, i.e.

$$d_{best} = \underset{d}{\arg\min}[C_{current}(d_i)].$$

In an embodiment, the signal processing logic 101 is configured to store the depth information value $d_{best}$ selected for the fragments of the subset or layer 301a in the memory 103, before proceeding with the subset or layer 301b of fragments in the same way. In an embodiment, the signal processing logic 101 is configured to use one or more of the depth information value $d_{best}$ selected for the fragments of the subset or layer 301a as the previously selected depth information value(s) $d_{prev}$ for processing the fragments of the subset or layer 301b in parallel (as well as the fragments of the subset or layer 301c in parallel).

In an embodiment, the signal processing logic 101 is configured to process the fragments of the first set or group 301 in parallel by computing for the fragments of the set or group 301 of currently processed fragments a plurality of matching costs $M_{current}(d_i)$ and by determining for each fragment a preliminary depth information value $\tilde{d}_{best}$ depending on the plurality of matching costs $M_{current}(d_i)$, i.e. without "penalization" by the cost function $C_{current}(d_i)$. In this embodiment, the preliminary depth information value $\tilde{d}_{best}$ is given by $$\tilde{d}_{best} = \underset{d}{\arg\min}[M_{current}(d_i)].$$

In this embodiment, the signal processing logic 101 is further configured to process the fragments, for instance, of the subset or layer 301a or the subset or layer 301b of the first set or group 301 in parallel by applying for each currently processed fragment of the subset or layer 301a of currently processed fragments an updating function in the form of the cost function $C_{current}(d_i)$ on the matching costs $M_{current}(d_i)$ to obtain an updated matching cost $C_{current}(d_i)$ only for those depth information value candidates of the plurality of depth information value candidates $d_i$ which are equal to the preliminary depth information value $\tilde{d}_{best}$ or a set of P previously selected depth information value(s) $d_{prev,k}$. On the basis of the updated matching costs $C_{current}(d_i)$ the signal processing logic 101 is configured to select the depth information value candidate $d_i$ as the depth information value $d_{best}$ that has a minimal updated matching cost:

$$d_{best} = \underset{d}{\arg\min} \left[ C_{current}(\tilde{d}_{best}), C_{current}(d_{prev_1}), \ldots, C_{current}(d_{prev_p}) \right].$$

As the person skilled in the art will appreciate, using the penalizing cost function defined in equation (7) above results in an embodiment, where the computations to be performed during the parallel processing of the layers are very simple, namely $$C_{current}(\tilde{d}_{best}) = M_{current}(\tilde{d}_{best}) + \text{penalty},$$

$$C_{current}(d_{prev_k}) = M_{current}(d_{prev_k}).$$

In an embodiment, the signal processing logic 101 to process the fragments of the first set or group 301 in parallel by computing for each currently processed fragment of the set or group 301 of currently processed fragments a plurality of matching costs $M_{current}(d_i)$ and by applying a processing function to each matching cost $M_{current}(d_i)$ to obtain for each matching cost $M_{current}(d_i)$ a further processed matching cost $\tilde{C}_{current}(d_i)$. In an embodiment, the processing function is configured to add the penalty value defined in equation (7) above to any matching cost $M_{current}(d_i)$ irrespective of the depth information value candidate $d_i$. In this embodiment the further processed matching costs $\tilde{C}_{current}(d_i)$ can be used to compute a preliminary depth information value $\tilde{d}_{best}$ for each currently processed fragment of the set or group 301 of currently processed fragments. In this embodiment, the signal processing logic 101 is further configured to process the fragments, for instance, of the subset or layer 301a or the subset or layer 301b of the first set or group 301 in parallel by applying for each currently processed fragment of the subset of currently processed fragments, for instance, the fragments of the subset or layer 301a or the subset or layer 301b of the first set or group 301, an updating function in the form of the cost function $C_{current}(d_i)$ on the matching costs $M_{current}(d_i)$ to obtain an updated matching cost $C_{current}(d_i)$ only for those depth information value candidates $d_i$ of the plurality of depth information value candidates, which are equal to the previously selected depth information values $d_{prev,k}$, and by determining for each currently processed fragment of the subset of currently processed fragments whether to select the depth information value candidate $d_i$ as the depth information value $d_{best}$ for the currently processed fragment depending on the updated matching cost $C_{current}(d_i)$ of the depth information value candidate $d_i$ or the further processed matching cost $\tilde{C}_{current}(d_i)$ of the depth information value candidate $d_i$. In an embodiment, the signal processing logic 101 is configured to select the depth information value $d_{best}$ on the basis of the following equation:

$$d_{best} = \underset{d}{\arg\min} \left[ \tilde{C}_{current}(\tilde{d}_{best}), C_{current}(d_{prev_1}), \ldots, C_{current}(d_{prev_p}) \right].$$

As the person skilled in the art will appreciate, using the penalizing cost function defined in equation (7) above results in an embodiment, where the computations to be performed during the parallel processing of the layers are very simple, namely:

$$C_{current}(d_{prev_k}) = \tilde{C}_{current}(d_{prev_k}) - \text{penalty} = M_{current}(d_{prev_k}).$$

Figure 4:
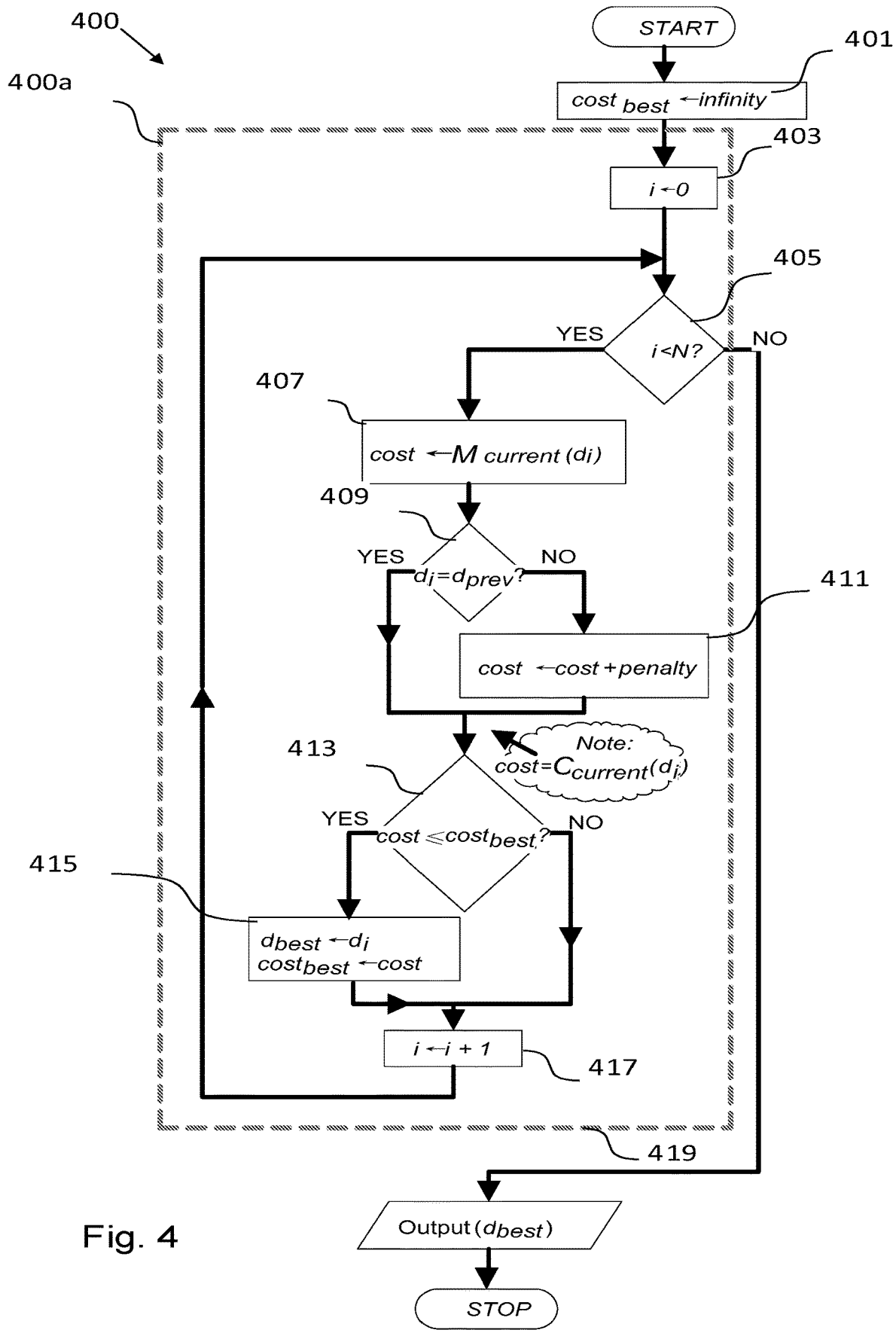
FIG. 4 shows a flow diagram of an algorithm implemented in an image processing apparatus according to an embodiment.

FIG. 4 shows a flow diagram of an algorithm, which can be implemented in an image processing apparatus according to an embodiment, for instance the image processing apparatus 100 shown in FIG. 1, for determining the depth information value $d_{best}$ for a single fragment of a subset or layer of fragments in a computationally efficient manner.

In an embodiment, a set of N eligible depth information value candidates $d_i \in \{d_0, d_1, \ldots, d_{N-1}\}$ is considered, wherein i is the respective depth information value candidate index with $i=0, \ldots, N-1$. After the initialization steps 401 and 403 in FIG. 4, for each eligible depth information value candidate $d_i$ (step 407 of FIG. 4), the updated matching cost $C_{current}(d_i)$ is calculated (using a similarity measure in the form of a local fragment matching cost $M_{current}(d)$) and assigned to the cost variable (step 407 of FIG. 4). The depth information value candidate $d_i$ is compared to the previously selected depth information value $d_{prev}$ (step 409 of FIG. 4). If the depth information value candidate $d_i$ and the previously selected depth information value $d_{prev}$ are equal, the value of the cost variable, i.e. the cost of the depth information value candidate $d_i$, is directly compared to the value of the $\text{cost}_{best}$ variable, which represents the best or lowest cost so far determined for the currently processed fragment with regard to the previously processed depth information value candidates. If the depth information value candidate $d_i$ and the previously selected depth information value $d_{prev}$ are not equal, a penalty value is added to the value of the cost variable to obtain a penalized cost value, and the penalized cost value is assigned to the cost variable (step 411 of FIG. 4) and compared to the value of the $\text{cost}_{best}$ variable. If the value of the cost variable is smaller or equal to the value of the $\text{cost}_{best}$ variable (step 413 of FIG. 4), the current depth information value candidate $d_i$ is assigned to the variable $d_{best}$, which represents the best depth information value so far determined for the current fragment with regard to the previously processed depth information value candidates, and the value of the cost variable is assigned to the $\text{cost}_{best}$ variable (step 415 of FIG. 4). If the value of the cost variable is larger than the value of the $\text{cost}_{best}$ variable, the variables $d_{best}$ and $\text{cost}_{best}$ are maintained, i.e. not changed or updated. Afterwards the depth information value candidate index i is incremented (step 417 of FIG. 4) and the above steps are performed for the new current depth information value candidate index i.

In an embodiment, for the first iteration, i.e. for i=0, for example, the comparison between the values of the cost variable and the $\text{cost}_{best}$ variable may be omitted, and the value of the $\text{cost}_{best}$ variable may be just set to the cost value calculated for the depth information value candidate $d_0$, and the value of the $d_{best}$ variable may be just set to the depth information value candidate $d_0$. In other words, in the search loop 400a as shown in FIG. 4, the smallest weighted matching cost $C_{current}(d_i)$ is found among all depth information value candidates $d_i$ and written to the $\text{cost}_{best}$ variable. The corresponding best depth information value d is stored in $d_{best}$ and fed to the output.

Once all depth information value candidates have been processed within the loop 400a, the final $d_{best}$ is outputted as the depth information value (step 419 of FIG. 4).

Figure 5:
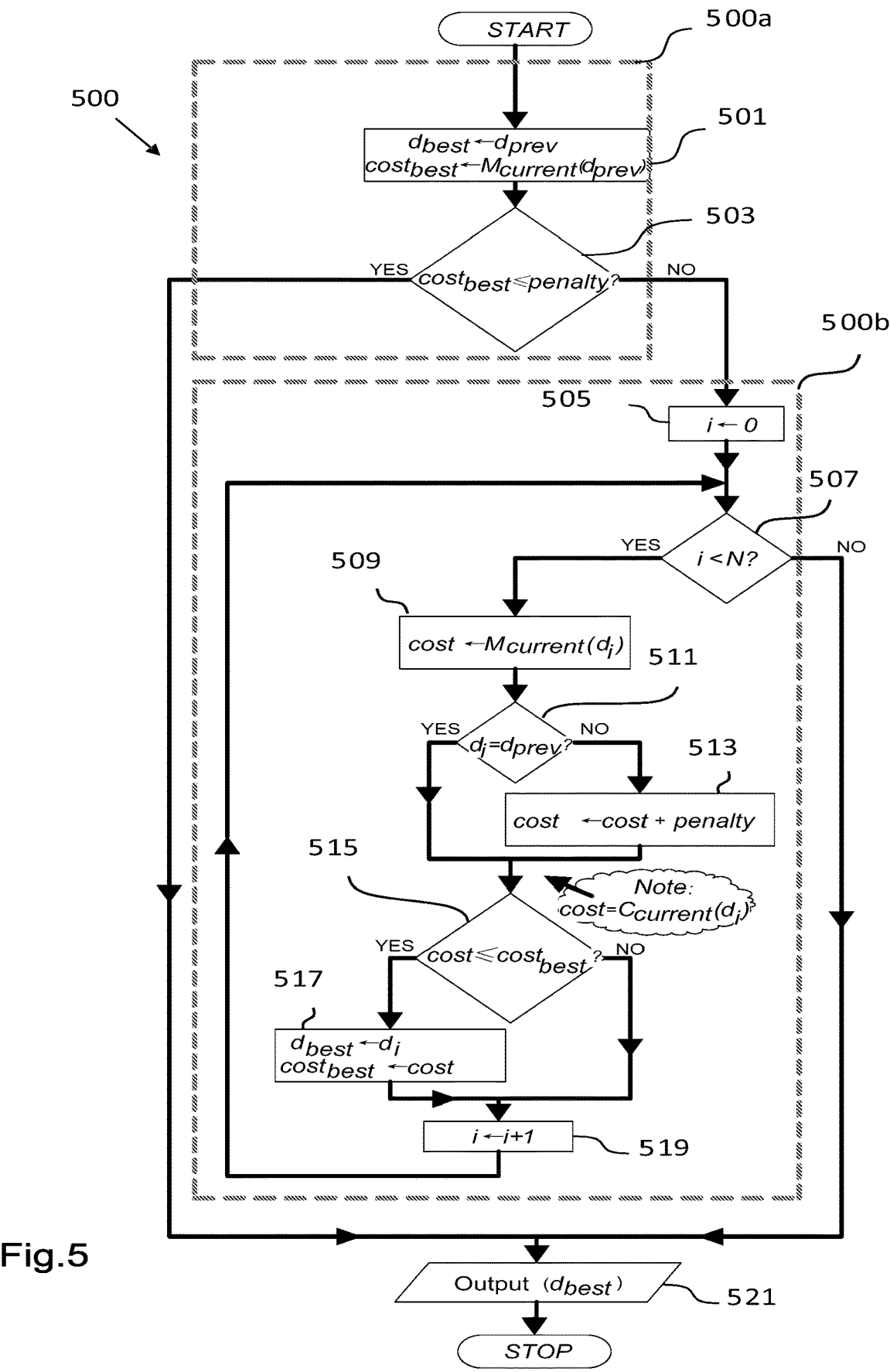
FIG. 5 shows a flow diagram of an algorithm implemented in an image processing apparatus according to an embodiment.

FIG. 5 shows a flow diagram of a further algorithm, which can be implemented in an image processing apparatus according to an embodiment, for instance the image processing apparatus 100 shown in FIG. 1, for determining the depth information value $d_{best}$ for a single fragment of a subset or layer of fragments in a computationally efficient manner.

In the algorithm described in the context of FIG. 4 all eligible depth information value candidates are considered equally and thus are processed without any specific order (e.g. according to their index i from 0 to N−1).

In the algorithm shown in FIG. 5 the search for the depth information value is reordered in a portion 500a such that the previously selected depth information value $d_{prev}$ is processed first (step 501 of FIG. 5). Its updated matching cost $C_{current}(d_{prev})$ is calculated, which is equal to its matching cost $M_{current}(d_{prev})$, because no penalty is added to the matching cost related to the previous depth information value $d_{prev}$ (step 501 of FIG. 5). Step 503 of FIG. 5 defines an update condition in that in case the calculated matching cost $M_{current}(d_{prev})$ is less than (or less or equal to) the penalty value, then the depth information value search loop 500b is skipped. In such a case, $d_{prev}$ (assigned also to $d_{best}$) is immediately fed to the output (step 521 of FIG. 5). Such a skipping of the depth information value search loop 500b allows for substantial reduction of computational complexity. As the loop 500b is identical to the loop 400a of the algorithm shown in FIG. 4 reference is made to the above detailed description of the steps 403 to 411 of loop 400a, which correspond to the steps 505 to 513 of FIG. 5.

As the person skilled in the art will appreciate, in the algorithms shown in FIGS. 4 and 5 only a single previously selected depth information value $d_{prev}$ is used for calculating the updated similarity measure for a depth information value candidate. However, as already described above, the present disclosure also covers embodiments, where a plurality of previously selected depth information values are considered and used for calculating the updated similarity measure. For instance, in embodiments of the disclosure the updated similarity measure can be calculated using a set of P previously selected depth information values $d_{prev_k}$ as follows:

$$C_{current}(d) = M_{current}(d) + \begin{cases} 0 & \text{if } d \text{ in } \{d_{prev_1}, d_{prev_2}, d_{prev_3}, ..., d_{prev_P}\} \\ \text{penalty} & \text{otherwise} \end{cases} \quad (9)$$

In an embodiment the set of P previously selected depth information values $d_{prev_k}$ is extended by depth information values that are similar, but not necessarily identical to previously selected depth information values selected for a previously processed fragment or fragments. For instance, in the case of the embodiment shown in FIG. 4, where only a single previously selected depth information value $d_{prev}$ is considered, the set of P previously selected depth information values can be extended to:

$$\{d_{prev}-m, \ldots, d_{prev}-1, d_{prev}, d_{prev}+1, \ldots, d_{prev}+n\}, \quad (10)$$

where the values m and n can be predefined or adapted.

Figure 6:
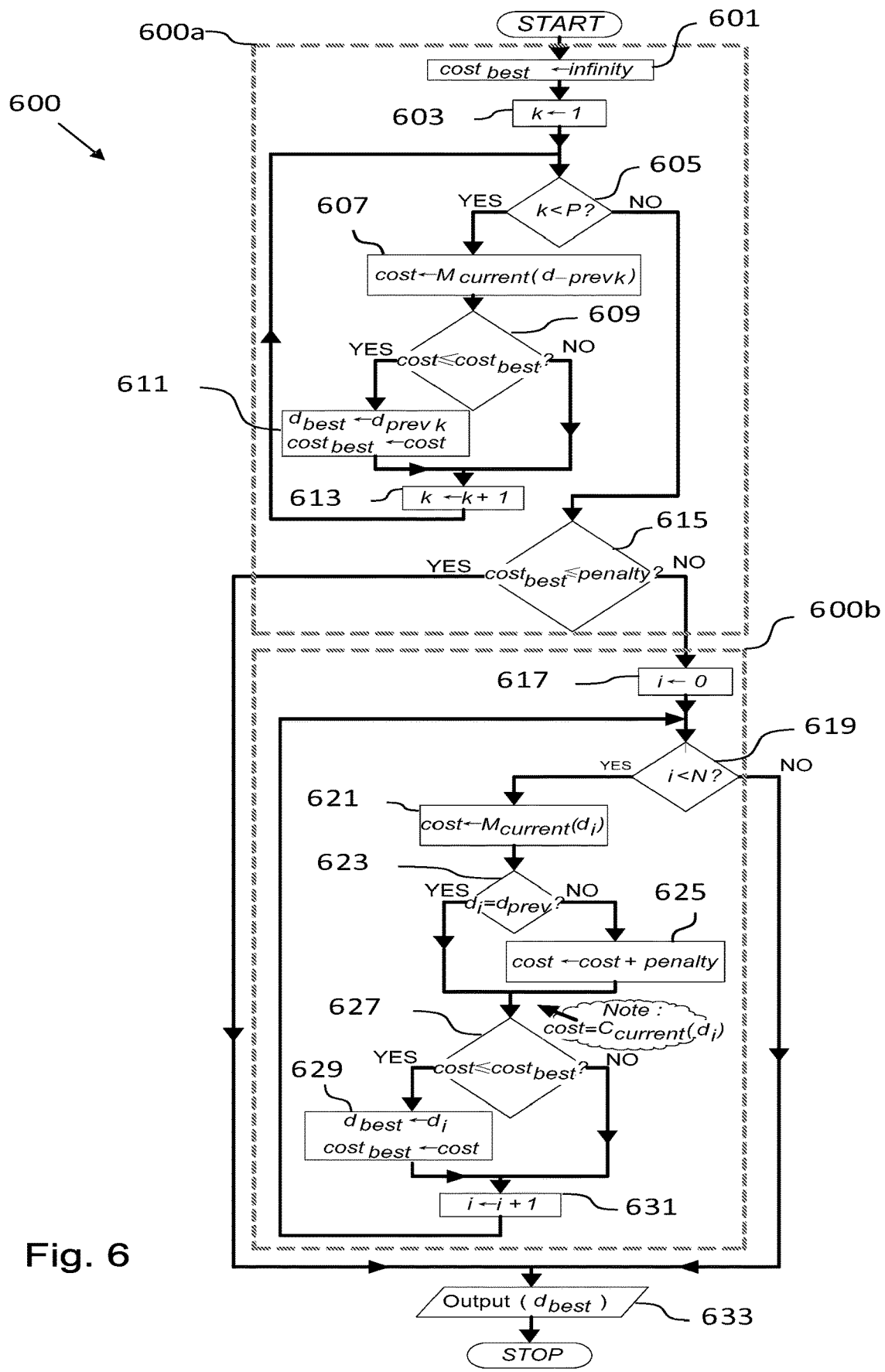
FIG. 6 shows a flow diagram of an algorithm implemented in an image processing apparatus according to an embodiment.

FIG. 6 shows a flow diagram of a further algorithm, which can be implemented in an image processing apparatus according to an embodiment, for instance the image processing apparatus 100 shown in FIG. 1, for determining the depth information value $d_{best}$ for a single fragment of a subset or layer of fragments in a computationally efficient manner. The embodiment shown in FIG. 6 is a variant of the embodiment shown in FIG. 5 for an extended set of previously selected depth information values $d_{prev_k}$. In such an embodiment, the exemplary set of P previously selected depth information values $\{d_{prev_1}, d_{prev_2}, d_{prev_3}, \ldots, d_{prev_P}\}$ from the previously processed fragments is considered first (see loop 600a of FIG. 6). The best $d_{prev_k}$ which has the minimal updated matching cost $C_{current}(d_{prev_k})$ is found (see steps 601-613 of FIG. 6) and if its updated matching cost is less than (or less than or equal to) the penalty value then the further depth information value search loop 600b is skipped as a result of the skipping condition defined in step 615 of FIG. 6.

In case the minimal updated matching cost is not less than (or less than or equal to) the penalty value the loop 600b of FIG. 6 will be executed, by processing the set of P previously selected depth information values $\{d_{prev_1}, d_{prev_2}, d_{prev_3}, \ldots, d_{prev_P}\}$ from the previously processed fragments in a predetermined order. The first depth information value $d_{prev_k}$ which has a updated matching cost $C_{current}(d_{prev_k})$, which is less than (or less than or equal to) the penalty value, is output as $d_{best}$ for the current fragment, and the further depth information search is skipped. If none of the P previously selected depth information values $d_{prev_k}$ has an updated matching cost, which is less than (or less than or equal to) the penalty value, the loop 600b is used to determine $d_{best}$ for the currently processed fragment. As the loop 600b is essentially identical to the loop 400a of the embodiment shown in FIG. 4 reference is made to the above detailed description of the steps 403 to 411 of loop 400a, which correspond to the steps 617 to 631 of FIG. 6.

In several of the above described embodiments, the updating function is a weighting function, the similarity measure is a matching cost and the updated similarity measure produced by the weighting function is an updated matching cost, where a penalty is added to the matching cost and the depth information value from the depth information value candidates is selected, which has the smallest updated matching cost.

In an embodiment, the updating function is a weighting function, the similarity measure is a matching cost and the updated similarity measure is an updated matching cost, wherein the weighting function is configured such that, in case the depth information value candidate is identical to the previously selected depth information value, the matching cost is maintained or only increased to a smaller extent compared to the case where the depth information value candidate is different from the previously selected depth information value.

In an embodiment of the disclosure, the updating function is a weighting function and the weighting function is configured such that, in case the depth information value candidate is different from the previously selected depth information value, the matching cost is increased by multiplying the matching cost with a first matching cost penalty to obtain the updated matching cost, and/or such that, in case the depth information value candidate is identical to the previously selected depth information value, the matching cost is maintained or increased by adding a second matching cost penalty to the matching cost to obtain the updated matching cost, or by multiplying the matching cost with a second matching cost penalty to obtain the updated matching cost, wherein the second matching cost penalty is smaller than the first matching cost penalty.

In an embodiment of the disclosure, the updating function is a weighting function, the similarity measure is a matching probability and the updated similarity measure is a updated matching probability, wherein the weighting function is configured such that, in case the depth information value candidate is different from the previously selected depth information value, the matching probability is decreased, and/or such that, in case the depth information value candidate is identical to the previously selected depth information value, the matching probability is maintained or only decreased to a smaller extent compared to the case where the depth information value candidate is different from the previously selected depth information value. In an embodiment, the weighting function is configured such that, in case the depth information value candidate is different from the previously selected depth information value, the matching probability is decreased by subtracting a first matching probability penalty from the matching probability to obtain the updated matching probability, or by dividing the matching probability by a first matching probability penalty to obtain the updated matching probability, and/or such that, in case the depth information value candidate is identical to the previously selected depth information value, the matching probability is maintained or decreased by subtracting a second matching probability penalty from the matching probability to obtain the updated matching probability, or by dividing the matching probability by a second matching probability penalty to obtain the updated matching probability, wherein the first matching probability penalty is larger than the second matching probability penalty.

In an embodiment, the updating function is a weighting function, the similarity measure is a matching probability, and the signal processing logic 103 is configured to select the depth information value from the depth information value candidates of the set of depth information value candidates, which has the largest updated matching probability.

In an embodiment, the updating function is a weighting function, the similarity measure is a matching probability based on the Bhattacharayya coefficient, which indicates the probability of two distributions being similar and which is known to the person skilled in the art. In an alternative embodiment, the similarity measure is a matching probability, which is derived from a matching cost by defining the matching probability to be proportional, for instance, to exp(−"matching cost") or a similar equation. In an embodiment, the matching probability is normalized within a range from [0,1].

Embodiments of the disclosure provide, amongst others, for the following advantages.

Embodiments of the disclosure allow the reuse of computations used for determining the matching costs $M_{current}$ ($d_i$). Embodiments of the disclosure allow for a parallelization in both processing directions, i.e. horizontally and vertically. The synergy of parallelization in both directions allows for even more efficient processing, e.g. calculation of more pixel subcomponents of matching costs (SAD/SSD) can be reused.

An example of a practical application of an embodiment is a parallel implementation of the algorithm shown in FIG. 3, wherein 2×10 (horizontal×vertical)=20 pixels are processed in parallel. The matching costs are calculated in parallel with reuse of pixel subcomponents, and thus only (5+2−1)×(5+10−2)=84 pixel subcomponents of the block matching sums need to be calculated (in comparison to 500 pixel subcomponents without parallelization). Therefore, in the case of the implementation on Xilinx ARTIX-7 FPGA, embodiments of the disclosure allow to attain a reduction of about 50% of the used hardware resources.

Embodiments of the disclosure may be implemented in a computer program for running on a computer system, at least including code portions for performing steps of a method according to the disclosure when run on a programmable apparatus, such as a computer system or enabling a programmable apparatus to perform functions of a device or system according to the disclosure.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Thus, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the disclosure is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

The invention claimed is:

1. An image processing apparatus for selecting a plurality of depth information values for a subset of currently processed fragments of a set of currently processed fragments of a currently processed digital image, wherein each fragment of the subset of currently processed fragments is a pixel or a group of pixels, the image processing apparatus comprising:
   one or more hardware processors configured to:
      process the currently processed fragments of the set of currently processed fragments in parallel by computing, for each currently processed fragment, a plurality of similarity measures based on a plurality of depth information value candidates, wherein each similarity measure of the plurality of similarity measures is a matching cost, the similarity measures are texture similarity measures and each depth information value candidate of the plurality of depth information value candidates defines a reference fragment candidate of a digital reference image, wherein the digital reference image is different from the currently processed digital image; and
      process the currently processed fragments of the subset of currently processed fragments in parallel by:
         comparing, for each currently processed fragment of the subset of currently processed fragments, a depth information value candidate of the plurality of depth information value candidates with a previously selected depth information value;
         applying, for each currently processed fragment of the subset of currently processed fragments, an updating function to obtain an updated similarity measure based on a similarity measure or a further processed similarity measure and the comparison between the depth information value candidate associated with the similarity measure and the previously selected depth information value, wherein each updated similarity measure is an updated matching cost, and applying the updating function comprises:
            if the depth information value candidate associated with a similarity measure of the plurality of similarity measures is different from the previously selected depth information value, increasing the matching cost by a first amount; and
            if the depth information value candidate associated with a similarity measure of the plurality of similarity measures is identical to the previously selected depth information value, maintaining the matching cost or increasing the matching cost by a second amount, wherein the second amount is smaller than the first amount; and
         determining, for each currently processed fragment of the subset of currently processed fragments, whether to select the depth information value candidate as the depth information value for the currently processed fragment based on the updated similarity measure of the depth information value candidate or the further processed similarity measure of the depth information value candidate.

2. The image processing apparatus of claim 1, wherein the one or more hardware processors are configured to apply, for each currently processed fragment of the subset of currently processed fragments, the updating function by applying, for each currently processed fragment of the subset of currently processed fragments, a weighting function to obtain the updated similarity measure.

3. The image processing apparatus of claim 1, wherein the one or more hardware processors are configured to:
   for each currently processed fragment of the set of currently processed fragments: compute the plurality of similarity measures and determine a preliminary depth information value based on the plurality of similarity measures; and
   for each currently processed fragment of the subset of currently processed fragments: apply the updating function to obtain the updated similarity measure for depth information value candidates of the plurality of depth information value candidates that are equal to the preliminary depth information value or the previously selected depth information value, wherein the updating function is a weighting function.

4. The image processing apparatus of claim 1, wherein the updating function is configured to:
   if the depth information value candidate associated with a similarity measure of the plurality of similarity measures is different from the previously selected depth information value, increase the matching cost by adding a first matching cost penalty to the matching cost to obtain the updated matching cost, or by multiplying the matching cost with the first matching cost penalty to obtain the updated matching cost; and
   if the depth information value candidate associated with a similarity measure of the plurality of similarity measures is identical to the previously selected depth information value, maintain the matching cost, increase the matching cost by adding a second matching cost penalty to the matching cost to obtain the updated matching cost, or increase the matching cost by multiplying the matching cost with the second matching cost penalty to obtain the updated matching cost, wherein the second matching cost penalty is smaller than the first matching cost penalty.

5. An image processing apparatus for selecting a plurality of depth information values for a subset of currently processed fragments of a set of currently processed fragments of a currently processed digital image, wherein each fragment of the subset of currently processed fragments is a pixel or a group of pixels, the image processing apparatus comprising:
   one or more hardware processors configured to:
      process the currently processed fragments of the set of currently processed fragments in parallel by computing, for each currently processed fragment, a plurality of similarity measures based on a plurality of depth information value candidates, wherein each similarity measure of the plurality of similarity measures is a matching probability, the similarity measures are texture similarity measures and each depth information value candidate of the plurality of depth information value candidates defines a reference fragment candidate of a digital reference image, wherein the digital reference image is different from the currently processed digital image; and process the currently processed fragments of the subset of currently processed fragments in parallel by:

comparing, for each currently processed fragment of the subset of currently processed fragments, a depth information value candidate of the plurality of depth information value candidates with a previously selected depth information value;

applying, for each currently processed fragment of the subset of currently processed fragments, an updating function to obtain an updated similarity measure based on a similarity measure or a further processed similarity measure and the comparison between the depth information value candidate associated with the similarity measure and the previously selected depth information value, wherein each updated similarity measure is an updated matching probability, and applying the updating function comprises:

if the depth information value candidate associated with a similarity measure of the plurality of similarity measures is different from the previously selected depth information value, decreasing the matching probability by a first amount; and if the depth information value candidate associated with a similarity measure of the plurality of similarity measures is identical to the previously selected depth information value, maintaining the matching probability or decreasing the matching probability by a second amount, wherein the second amount is smaller than the first amount; and determining, for each currently processed fragment of the subset of currently processed fragments, whether to select the depth information value candidate as the depth information value for the currently processed fragment based on the updated similarity measure of the depth information value candidate or the further processed similarity measure of the depth information value candidate.

6. The image processing apparatus of claim 1, wherein the one or more hardware processors are configured to:

compute, for each currently processed fragment of the set of currently processed fragments, a plurality of similarity measures;

obtain, for each of the plurality of similarity measure, a further processed similarity measure by applying a processing function to each similarity measure;

apply, for each currently processed fragment of the subset of currently processed fragments, the updating function to obtain an updated similarity measure for depth information value candidates of the plurality of depth information value candidates that are equal to the previously selected depth information value, wherein the updating function is a weighting function; and determine, for each currently processed fragment of the subset of currently processed fragments, whether to select the depth information value candidate as the depth information value for the currently processed fragment based on the updated similarity measure of the depth information value candidate or the further processed similarity measure of the depth information value candidate.

7. The image processing apparatus of claim 6, wherein each similarity measure of the plurality of similarity measures is a matching cost and each further processed similarity measure of the plurality of further processed similarity measures is a further processed matching cost, the processing function is configured to increase the matching cost, and the weighting function is configured to:

if the depth information value candidate associated with a similarity measure of the plurality of similarity measures is different from the previously selected depth information value, increase the matching cost by a first amount; and if the depth information value candidate associated with a similarity measure of the plurality of similarity measures is identical to the previously selected depth information value, maintain the matching cost or increase the matching cost by a second amount, wherein the second amount is smaller than the first amount.

8. The image processing apparatus of claim 7, wherein the processing function is configured to increase the matching cost by adding a matching cost penalty to the matching cost to obtain the further processed matching cost or by multiplying the matching cost with a matching cost penalty to obtain the further processed matching cost, and the weighting function is configured to:

if the depth information value candidate associated with a similarity measure of the plurality of similarity measures is different from the previously selected depth information value, increase the matching cost by adding a first matching cost penalty to the matching cost to obtain the updated matching cost, or by multiplying the matching cost with a first matching cost penalty to obtain the updated matching cost; and if the depth information value candidate associated with a similarity measure of the plurality of similarity measures is identical to the previously selected depth information value, maintain the matching cost, increase the matching cost by adding a second matching cost penalty to the matching cost to obtain the updated matching cost, or increase the matching cost by multiplying the matching cost with the second matching cost penalty to obtain the updated matching cost, wherein the second matching cost penalty is smaller than the first matching cost penalty.

9. The image processing apparatus of claim 6, wherein each similarity measure of the plurality of similarity measures is a matching probability and each updated similarity measure of the plurality of updated similarity measures is an updated matching probability, the processing function is configured to decrease the matching probability, and the weighting function is configured to:

if the depth information value candidate associated with a similarity measure of the plurality of similarity measures is different from the previously selected depth information value, decrease the matching probability by a first amount; and if the depth information value candidate associated with a similarity measure of the plurality of similarity measures is identical to the previously selected depth information value, maintain the matching probability, decrease the matching probability by a second amount, wherein the second amount is smaller than the first amount.

10. The image processing apparatus of claim 9, wherein the processing function is configured to decrease the matching probability by subtracting a matching probability penalty from the matching probability to obtain the updated matching probability or by dividing the matching probability by the matching probability penalty to obtain the updated matching probability, and the weighting function is configured to:
if the depth information value candidate associated with a similarity measure of the plurality of similarity measures is different from the previously selected depth information value, decrease the matching probability by subtracting a first matching probability penalty from the matching probability to obtain the updated matching probability, or by dividing the matching probability by the first matching probability penalty to obtain the updated matching probability; and
if the depth information value candidate associated with a similarity measure of the plurality of similarity measures is identical to the previously selected depth information value, maintain the matching probability, decrease the matching probability by subtracting a second matching probability penalty from the matching probability to obtain the updated matching probability, or decrease the matching probability by dividing the matching probability by the second matching probability penalty to obtain the updated matching probability, wherein the first matching probability penalty is larger than the second matching probability penalty.

11. The image processing apparatus of claim 1, wherein the one or more hardware processors are configured to select, for each fragment of the currently processed subsets of fragments, the depth information value for the fragment from the depth information value candidates associated with the plurality of similarity measures computed for the fragment that has the smallest weighted matching cost.

12. The image processing apparatus of claim 5, wherein the one or more hardware processors are configured to select, for each fragment of the currently processed subsets of fragments, the depth information value for the fragment from the depth information value candidates associated with the plurality of similarity measures computed for the fragment that has the largest weighted matching probability.

13. An image processing method for selecting a plurality of depth information values for a subset of currently processed fragments of a set of currently processed fragments of a currently processed digital image, wherein each fragment of the subset of currently processed fragments is a pixel or a group of pixels, the image processing method comprising:
processing the currently processed fragments of the set of currently processed fragments in parallel by computing, for each currently processed fragment, a plurality of similarity measures based on a plurality of depth information value candidates, wherein each similarity measure of the plurality of similarity measures is a matching cost, the similarity measures are texture similarity measures and each depth information value candidate of the plurality of depth information value candidates defines a reference fragment candidate of a digital reference image, wherein the digital reference image is different from the currently processed digital image; and
processing the currently processed fragments of the subset of currently processed fragments in parallel by:
comparing, for each currently processed fragment of the subset of currently processed fragments, a depth information value candidate of the plurality of depth information value candidates with a previously selected depth information value;
applying, for each currently processed fragment of the subset of currently processed fragments, an updating function to obtain an updated similarity measure based on a similarity measure or a further processed similarity measure and the comparison between the depth information value candidate associated with the similarity measure and the previously selected depth information value, wherein each updated similarity measure is an updated matching cost, and applying the updating function comprises:
if the depth information value candidate associated with a similarity measure of the plurality of similarity measures is different from the previously selected depth information value, increasing the matching cost by a first amount; and
if the depth information value candidate associated with a similarity measure of the plurality of similarity measures is identical to the previously selected depth information value, maintaining the matching cost or increasing the matching cost by a second amount, wherein the second amount is smaller than the first amount; and
determining, for each currently processed fragment of the subset of currently processed fragments, whether to select the depth information value candidate as the depth information value for the currently processed fragment based on the updated similarity measure of the depth information value candidate or the further processed similarity measure of the depth information value candidate.

14. A non-transient computer readable medium containing program instructions for selecting a plurality of depth information values for a subset of currently processed fragments of a set of currently processed fragments of a currently processed digital image, wherein each fragment of the subset of currently processed fragments is a pixel or group of pixels, and wherein the instructions when executed by one or more hardware processors, cause the one or more hardware processors to perform operations comprising:
processing the currently processed fragments of the set of currently processed fragments in parallel by computing, for each currently processed fragment, a plurality of similarity measures based on a plurality of depth information value candidates, wherein the similarity measures are texture similarity measures and each depth information value candidate of the plurality of depth information value candidates defines a reference fragment candidate of a digital reference image, wherein the digital reference image is different from the currently processed digital image; and
processing the currently processed fragments of the subset of currently processed fragments in parallel by:
comparing, for each currently processed fragment of the subset of currently processed fragments, a depth information value candidate of the plurality of depth information value candidates with a previously selected depth information value;

applying, for each currently processed fragment of the subset of currently processed fragments, an updating function to obtain an updated similarity measure based on a similarity measure or a further processed similarity measure and the comparison between the depth information value candidate associated with the similarity measure and the previously selected depth information value; and determining, for each currently processed fragment of the subset of currently processed fragments, whether to select the depth information value candidate as the depth information value for the currently processed fragment based on the updated similarity measure of the depth information value candidate or the further processed similarity measure of the depth information value candidate.

15. The image processing apparatus of claim 5, wherein the updating function is configured to:

if the depth information value candidate associated with a similarity measure of the plurality of similarity measures is different from the previously selected depth information value, decrease the matching probability by subtracting a first matching probability penalty from the matching probability to obtain the updated matching probability, or by dividing the matching probability by the first matching probability penalty to obtain the updated matching probability; and if the depth information value candidate associated with a similarity measure of the plurality of similarity measures is identical to the previously selected depth information value, maintain the matching probability, decrease the matching probability by subtracting a second matching probability penalty from the matching probability to obtain the updated matching probability, or decrease the matching probability by dividing the matching probability by the second matching probability penalty to obtain the updated matching probability, wherein the first matching probability penalty is larger than the second matching probability penalty.

16. The image processing apparatus of claim 5, wherein the one or more hardware processors are configured to apply, for each currently processed fragment of the subset of currently processed fragments, the updating function by applying, for each currently processed fragment of the subset of currently processed fragments, a weighting function to obtain the updated similarity measure.

17. The image processing apparatus of claim 5, wherein the one or more hardware processors are configured to:

for each currently processed fragment of the set of currently processed fragments: compute the plurality of similarity measures and determine a preliminary depth information value based on the plurality of similarity measures; and for each currently processed fragment of the subset of currently processed fragments: apply the updating function to obtain the updated similarity measure for depth information value candidates of the plurality of depth information value candidates that are equal to the preliminary depth information value or the previously selected depth information value, wherein the updating function is a weighting function.

18. The image processing apparatus of claim 5, wherein the one or more hardware processors are configured to:

compute, for each currently processed fragment of the set of currently processed fragments, a plurality of similarity measures;

obtain, for each of the plurality of similarity measure, a further processed similarity measure by applying a processing function to each similarity measure;

apply, for each currently processed fragment of the subset of currently processed fragments, the updating function to obtain an updated similarity measure for depth information value candidates of the plurality of depth information value candidates that are equal to the previously selected depth information value, wherein the updating function is a weighting function; and determine, for each currently processed fragment of the subset of currently processed fragments, whether to select the depth information value candidate as the depth information value for the currently processed fragment based on the updated similarity measure of the depth information value candidate or the further processed similarity measure of the depth information value candidate.

19. An image processing method for selecting a plurality of depth information values for a subset of currently processed fragments of a set of currently processed fragments of a currently processed digital image, wherein each fragment of the subset of currently processed fragments is a pixel or a group of pixels, the image processing method comprising:

processing the currently processed fragments of the set of currently processed fragments in parallel by computing, for each currently processed fragment, a plurality of similarity measures based on a plurality of depth information value candidates, wherein each similarity measure of the plurality of similarity measures is a matching probability, the similarity measures are texture similarity measures and each depth information value candidate of the plurality of depth information value candidates defines a reference fragment candidate of a digital reference image, wherein the digital reference image is different from the currently processed digital image; and processing the currently processed fragments of the subset of currently processed fragments in parallel by:

comparing, for each currently processed fragment of the subset of currently processed fragments, a depth information value candidate of the plurality of depth information value candidates with a previously selected depth information value;

applying, for each currently processed fragment of the subset of currently processed fragments, an updating function to obtain an updated similarity measure based on a similarity measure or a further processed similarity measure and the comparison between the depth information value candidate associated with the similarity measure and the previously selected depth information value, wherein each updated similarity measure is an updated matching probability, and applying the updating function comprises:

if the depth information value candidate associated with a similarity measure of the plurality of similarity measures is different from the previously selected depth information value, decreasing the matching probability by a first amount; and if the depth information value candidate associated with a similarity measure of the plurality of similarity measures is identical to the previously selected depth information value, maintaining the matching probability or decreasing the matching probability by a second amount, wherein the second amount is smaller than the first amount; and determining, for each currently processed fragment of the subset of currently processed fragments, whether to select the depth information value candidate as the depth information value for the currently processed fragment based on the updated similarity measure of the depth information value candidate or the further processed similarity measure of the depth information value candidate.

20. The method of claim 19, wherein the updating function is configured to:

if the depth information value candidate associated with a similarity measure of the plurality of similarity measures is different from the previously selected depth information value, decrease the matching probability by subtracting a first matching probability penalty from the matching probability to obtain the updated matching probability, or by dividing the matching probability by the first matching probability penalty to obtain the updated matching probability; and if the depth information value candidate associated with a similarity measure of the plurality of similarity measures is identical to the previously selected depth information value, maintain the matching probability, decrease the matching probability by subtracting a second matching probability penalty from the matching probability to obtain the updated matching probability, or decrease the matching probability by dividing the matching probability by the second matching probability penalty to obtain the updated matching probability, wherein the first matching probability penalty is larger than the second matching probability penalty.

21. The method of claim 19, further comprising: selecting, for each fragment of the currently processed subsets of fragments, the depth information value for the fragment from the depth information value candidates associated with the plurality of similarity measures computed for the fragment that has the largest weighted matching probability.

22. The method of claim 19, further comprising computing, for each currently processed fragment of the set of currently processed fragments, a plurality of similarity measures;

obtaining, for each of the plurality of similarity measure, a further processed similarity measure by applying a processing function to each similarity measure;

applying, for each currently processed fragment of the subset of currently processed fragments, the updating function to obtain an updated similarity measure for depth information value candidates of the plurality of depth information value candidates that are equal to the previously selected depth information value, wherein the updating function is a weighting function; and determining, for each currently processed fragment of the subset of currently processed fragments, whether to select the depth information value candidate as the depth information value for the currently processed fragment based on the updated similarity measure of the depth information value candidate or the further processed similarity measure of the depth information value candidate.

23. The method of claim 13, wherein the updating function is configured to:

if the depth information value candidate associated with a similarity measure of the plurality of similarity measures is different from the previously selected depth information value, increase the matching cost by adding a first matching cost penalty to the matching cost to obtain the updated matching cost, or by multiplying the matching cost with the first matching cost penalty to obtain the updated matching cost; and if the depth information value candidate associated with a similarity measure of the plurality of similarity measures is identical to the previously selected depth information value, maintain the matching cost, increase the matching cost by adding a second matching cost penalty to the matching cost to obtain the updated matching cost, or increase the matching cost by multiplying the matching cost with the second matching cost penalty to obtain the updated matching cost, wherein the second matching cost penalty is smaller than the first matching cost penalty.

24. The method of claim 13, further comprising: selecting, for each fragment of the currently processed subsets of fragments, the depth information value for the fragment from the depth information value candidates associated with the plurality of similarity measures computed for the fragment that has the smallest weighted matching cost.

25. The method of claim 13, further comprising computing, for each currently processed fragment of the set of currently processed fragments, a plurality of similarity measures;

obtaining, for each of the plurality of similarity measure, a further processed similarity measure by applying a processing function to each similarity measure;

applying, for each currently processed fragment of the subset of currently processed fragments, the updating function to obtain an updated similarity measure for depth information value candidates of the plurality of depth information value candidates that are equal to the previously selected depth information value, wherein the updating function is a weighting function; and determining, for each currently processed fragment of the subset of currently processed fragments, whether to select the depth information value candidate as the depth information value for the currently processed fragment based on the updated similarity measure of the depth information value candidate or the further processed similarity measure of the depth information value candidate.

* * * * *